Patented Nov. 14, 1944

2,362,627

UNITED STATES PATENT OFFICE 2,362,627

MOLDING POWDERS

Eustace Glycofrides, Toledo, Ohio, assignor to Owens-Illinois Glass Company, a corporation of Ohio No Drawing. Application May 15, 1940,
Serial No. 335,319

1 Claim. (Cl. 106—218)

My invention relates to polymerized products and methods for producing the same. More particularly, it has reference to a molding compound in which a thermoplastic material, such as pine wood pitch, is employed as a basic material and by the action of lime or a like reagent is converted into a thermosetting type of material which is similar in performance and physical properties to materials now on the market under the trade name "Bakelite." The latter is a synthetic resin obtained by the condensation of formaldehyde with phenols, and at the present day is extensively used as a thermosetting material in the manufacture of molded articles and for other purposes. The term "thermosetting" as herein used is applied to thermoplastics which when heated set or harden.

An object of invention is to provide a molding compound or material having the desirable characteristics of Bakelite molding powders, but which may be produced at a small cost as compared with that of commercial molding powders at present on the market and which will permit the utilization of molding compounds in many instances where such present day commercial molding powders are prohibited on account of the high cost.

A further object of the invention is to provide a molding powder and method of producing the same in which extracted pine wood pitch is used as a basic ingredient comprising a large percentage of the compound, thereby greatly reducing the cost as compared to the molding compounds for like purposes at present on the market.

A further object of my invention is to provide a method in which lime or a like material is used as a reagent or accelerator for polymerizing a thermoplastic material and particularly pine wood pitch, and thereby produce a thermosetting material suited for molding purposes.

A further object of the invention is to provide a method in which pine wood pitch or a similar resinous material is reacted with an accelerator such as lime to produce a partial polymerization and then combined with other ingredients to produce a thermosetting molding powder or material, and thereafter molding the material and causing thermosetting thereof by heat and pressure applied in the mold.

A further object of the invention is to provide a molding powder comprising a mixture of pine wood pitch, lime and other ingredients, in which the pitch has been acted upon by the lime to produce partial polymerization, thereby producing a molding material of the thermosetting type adapted to be molded and set by heat and pressure.

Pine wood pitch is extensively produced as a by-product in the manufacture of turpentine, rosin and other pine wood constituents, and comprises the residue left after separation of such other constituents. Reference may be had to U. S. Patent 2,115,406 to Maters, April 26, 1938, for a more detailed disclosure of the characteristics of pine wood pitch and methods of producing it. Such patent describes methods of polymerizing and preparing molding powders from extracted pine wood pitch, (1) by condensation methods with formaldehyde in a kettle with applied heat; (2) by the incorporation of hexamethylene-tetramine or paraformaldehyde; or (3) by incorporated phenol formaldehyde resins with pine wood pitch. Materials reacted as described in this patent will form molding compounds which are similar to commercial powders, but not satisfactory as to their performance in molding and especially with regard to the speed of molding. The incorporation of phenol formaldehyde resin in the required proportions to obtain acceptable performance makes them expensive because there is no method known at present to incorporate more than a very small amount of the pine tar resins without unduly slowing down the molding operations.

Another object of the present invention is to provide an improved method of polymerizing and preparing molding compounds from pine wood pitch, by which, as compared with the methods disclosed in the above patent, a large proportion of pine wood pitch may be incorporated in the materials with a corresponding reduction in the cost.

Other objects of the invention will appear hereinafter.

In practicing my invention, I provide a mixture of pine wood pitch, or like resinous material, and lime (CaO) and cause the lime to react with the pitch and thereby produce polymerization which is carried on to a certain point in preparing the mixture for use as a molding powder. The point to which this reaction is carried is described as the end point of the material. The lime acts as an accelerator or catalyst in this polymerizing process. A pebble mill is preferably employed for this polymerization. Wood flour is used as a filler and a portion of the wood flour is placed in the mill with the pine pitch and lime.

The time required for the reaction depends largely upon the proportion of lime used. If the length of time in the pebble mill is increased, the required amount of lime decreases. For example, if the pebble milling is carried on for 48 hours, the required amount of lime by volume is about 6% of the amount of pine wood pitch. The amount of lime necessary to set up, that is, react or polymerize the material, I have found to range from about equal parts by volume of the pine wood pitch and lime to about 6% of the whole volume of the material.

The required stage of the material is determined by taking samples periodically and testing them. They may be prepared for testing by subjecting the material to a moderate heat and pressure, as by rolling and condensing with heated calendar rolls. The condensed material is then ground to the proper particle size for molding. This powder or granulated material may be molded into a piece, for example, two inches more or less in diameter, and about 1/16th inch thick. When the required stage of the material in the pebble mill has been reached, the molding powder will set in about 30 seconds at 380° F., which is described as the end point of the material. The above process provides what is herein termed a basic compound.

When this stage has been reached, any additional ingredients required to complete the molding powder are added to the mixture in the pebble mill. Such additional ingredients may include a lubricant as, for example, calcium stearate, in the amount of ½% of the mixture. Additional wood flour may also be added to complete the required amount of filler, this to be, for example, 50% more or less, of the final product. Coloring material of any desired color, for example, Cabot carbon black, may be added in a suitable amount (1% or less). If a higher finish is required, a small amount of hexamethylene-tetramine is added.

I have found that the molding compound resulting from the above process gives a performance and has a durability and finish equal to the characteristics of current phenolic molding powders, and also has substantially the same time cycle of curing and a substantially higher torque strength. It has a setting time for molding of from 15 to 20 seconds, which equals the time cycle of the best commercial materials available at the present time.

The following are two examples of basic compounds prepared in accordance with the present invention, using pine wood pitch as a base.

|  | Grams |
|---|---|
| (A) Pine wood pitch | 6,000 |
| Wood flour | 3,000 |
| Lime (pebble milled for 24 hours) | 1,800 |
| (B) Pine wood pitch | 6,000 |
| Wood flour | 3,000 |
| Lime | 1,800 |
| Hexamethylene-tetramine | 600 |
| Color material (pebbled milled for 24 hours) | 120 |

Below are given eight examples of molding compounds which I have prepared by using the above basic compounds (designated A and B respectively) with other ingredients added. These additional ingredients may be milled with the basic compounds for completing the mixture. Such mixture may then be rolled or compressed while subjected to sufficient heat to produce a plastic mass which when cooled is ground to the required particle size. I have found that the resultant powders or molding compounds when molded under the required heat and pressure will set in the mold in about 20 to 30 seconds.

These molding compounds are as follows:

|  | Grams |
|---|---|
| (1) (A) compound | 1,000 |
| Wood flour (the proportion of wood flour being about equal to that of the pine wood pitch) | 230 |
| Calcium stearate | 8 |
| Cabot carbon black | 16 |
| (2) (B) compound | 1,000 |
| Wood flour | 230 |
| Calcium stearate | 8 |
| Cabot carbon black (this molding powder gives a superior molded finish because of the presence of the hexamethylene-tetramine) | 16 |
| (3) (A) compound | 199 |
| Wood flour | 51 |
| Phenolic resin (regular commercial grade—30% by volume) | 37 |
| Color | 2.4 |
| Calcium stearate | 1.2 |
| (4) (B) compound | 199 |
| Wood flour | 51 |
| Phenolic resin (30%—regular commercial grade) | 37 |
| Color | 2.4 |
| Calcium stearate | 1.2 |
| (5) (A) compound | 199 |
| Wood flour | 51 |
| Phenolic resin (20%—regular commercial grade) | 20 |
| Color | 2.4 |
| Calcium stearate | 1.2 |
| (6) (B) compound | 199 |
| Wood flour | 51 |
| Phenolic resin (20%—regular commercial grade) | 20 |
| Color | 2.4 |
| Calcium stearate | 1.2 |
| (7) (A) compound | 130 |
| Phenolic resin (regular commercial grade) | 200 |
| Wood flour | 198 |
| Calcium stearate | 2.5 |
| Color | 5 |
| (8) (B) compound | 130 |
| Phenolic resin (regular commercial grade) | 200 |
| Wood flour | 198 |
| Calcium stearate | 2.5 |
| Color | 5 |

Modifications may be resorted to within the spirit and scope of the appended claims.

It will be understood that the use of some of the specified materials in making the molding powders is optional, depending upon the particular results required. The coloring material, for example, may be added in smaller or greater amounts than indicated in the specific examples given or may be omitted entirely. The coloring material may be added either in preparing the basic compound as indicated in Example B or may be included as indicated in the above Examples 1 to 8 inclusive of materials to be added to the basic compounds and where thus used may be omitted in preparing the basic compound.

The materials which are added to the basic compounds, after the preparation of the latter, may be compounded and intermixed therewith either in the ball mill or otherwise. Ordinarily, when the remaining ingredients have been added to the basic compound, they are milled for an hour, more or less, to complete the mixing operation.

I claim:

The method of producing molded articles which comprises compounding a mixture consisting of extracted pine wood pitch, lime and a filling material, said pitch being characterized by substantial insolubility in petroleum hydrocarbons and comprising a residue low in abietic acid remaining after the separation of refined rosin high in abietic acid from the resinous material obtained by extraction of pine wood with a solvent, milling said mixture and causing the lime to polymerize the pitch to a predetermined intermediate stage, and thereafter molding the compound under heat and pressure and thereby causing the lime to effect further polymerization and hardening of the molded material.

EUSTACE GLYCOFRIDES.